US006691814B2

(12) United States Patent
Toyoda

(10) Patent No.: US 6,691,814 B2
(45) Date of Patent: Feb. 17, 2004

(54) REAR SUSPENSION STRUCTURE FOR MOTORCYCLE

(75) Inventor: Hidetoshi Toyoda, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/158,873

(22) Filed: Jun. 3, 2002

(65) Prior Publication Data

US 2003/0006577 A1 Jan. 9, 2003

(30) Foreign Application Priority Data

Jul. 3, 2001 (JP) ........................................ 2001-201714

(51) Int. Cl.$^7$ .............................................. B62K 11/00
(52) U.S. Cl. ........................................ 180/227; 180/219
(58) Field of Search ................................ 180/219, 227; 280/284–286, 288, 275

(56) References Cited

U.S. PATENT DOCUMENTS

| 4,621,706 A | * | 11/1986 | Boyesen .................. 180/227 |
| 4,765,432 A | * | 8/1988 | Odom ...................... 180/227 |
| 5,062,495 A | | 11/1991 | Padgett |
| 5,211,256 A | * | 5/1993 | Muramatsu .............. 180/219 |
| 5,531,289 A | * | 7/1996 | Muramatsu .............. 180/227 |
| 6,024,185 A | * | 2/2000 | Okada et al. ............ 180/227 |

FOREIGN PATENT DOCUMENTS

GB          109364          9/1917

* cited by examiner

Primary Examiner—Lesley D. Morris
Assistant Examiner—L. Lum
(74) Attorney, Agent, or Firm—Birch, Stewart, Kolasch & Birch, LLP

(57) ABSTRACT

A left arm portion and a right arm portion which extend in the front-rear direction are provided on the left and right sides of a swing arm with a window portion for passing a rear shock absorber unit therethrough provided between the left arm portion and the right arm portion. A shock absorber-fitting beam is provided like a bridge between the left arm portion and the right arm portion with a swing arm side fitting portion of the rear shock absorber unit fitted to the shock absorber-fitting beam. A whole part or a part of the window portion is closed with the shock absorber-fitting beam. The swing arm can be reinforced with the shock absorber-fitting beam with the flexural rigidity and torsional rigidity of the swing arm being enhanced. Moreover, since the upper end of the shock absorber unit is fitted to the swing arm side, it is unnecessary to provide, for example, a fitting portion for the upper end of the shock absorber unit on the vehicle body frame side, so that an increase in weight can be restrained.

20 Claims, 8 Drawing Sheets

REAR SUSPENSION STRUCTURE FOR MOTORCYCLE

CROSS-REFERENCE TO RELATED APPLICATIONS

The present application claims priority under 35 USC 119 to Japanese Patent Application No. 2001-201714 filed on Jul. 3, 2001 the entire contents thereof is hereby incorporated by reference.

BACKGROUND OF THE INVENTION

1. Field of the Invention

The present invention relates to a rear suspension structure for a motorcycle which is suitable for enhancing the rigidity of a swing arm while restraining an increase in the weight of the vehicle body.

2. Description of Background Art

As a rear suspension structure for a motorcycle, there is generally a structure in which a swing arm extends from the vehicle body side towards the rear side of the vehicle body. End portions of a rear shock absorber unit are fitted to the swing arm and to the vehicle body side. This structure will be described referring to FIG. 10.

FIG. 10 is a side view of a major part for illustrating a conventional rear suspension structure. A structure is provided in which respective rear portions of left and right main frames 301, 301 (the main frame 301 on the deep side is not shown) constituting a vehicle body frame 300 are connected to each other by an upper portion cross pipe 302 and a lower portion cross pipe 303. The upper portion cross pipe 302 is provided with a bracket portion 304 projecting rearwardly. An upper end portion of a rear shock absorber unit 306 is fitted to the bracket portion 304. A lower end portion of the rear shock absorber unit 306 is fitted to a lower portion of a swing arm 308 through a link 307. The link 307 is fitted to a lower portion of the lower portion cross pipe 303 through a link 311.

The swing arm 308 is a member provided with a shock absorber inserting hole 313 for passing the rear shock absorber unit 306 therethrough.

In the above technology, the swing arm 308 is provided with the shock absorber inserting hole 313 for the rear shock absorber unit 306, so that the flexural rigidity and torsional rigidity of the swing arm 308 are reduced due to the presence of the shock absorber inserting hole 313, which is considered to affect drivability and stability at the time of cornering, for example.

However, the measure of increasing the size of the swing arm 308 or merely fitting a reinforcement member to the swing arm 308 would increase the weight of the vehicle body or impair the motion performance of the vehicle.

SUMMARY AND OBJECTS OF THE INVENTION

Accordingly, it is an object of the present invention to enhance the rigidity of the swing arm while restraining an increase in the weight of the vehicle body, by improving the rear suspension structure for motorcycle.

In order to attain the above object, according to the present invention a rear suspension structure includes a swing arm having one end swingably fitted to a pivot shaft provided on the vehicle body side. A wheel is fitted to the other end of the swing arm. A shock absorber unit includes an upper end fitted to the swing arm with the lower end of the shock absorber unit connected to the vehicle body side. Arm portions extending in the front-rear direction are provided on the left and right sides of the swing arm. A window portion for passing the shock absorber unit therethrough is provided between the arm portions, a cross beam is provided between the arm portions as a bridge. The upper end of the shock absorber unit is fitted to the cross beam and the whole part or a part of the window portion is closed with the cross beam.

Since the whole part or a part of the window portion of the swing arm is closed with the cross beam, the swing arm can be reinforced by the cross beam, and the flexural rigidity and torsional rigidity of the swing arm can be enhanced. Moreover, since the upper end of the shock absorber unit is fitted to the swing arm side, it is unnecessary to provide, for example, a fitting portion for the upper end of the shock absorber unit on the vehicle body frame side. Therefore, an increase in weight can be restrained.

According to the present invention, the cross beam is trapezoid shaped in front view, and the upper end of the shock absorber unit is fitted to the upper side of the cross beam.

Since the cross beam is trapezoid shaped in front view, vertical forces exerted on the cross beam upon extension or contraction of the shock absorber unit can be received roughly as a tensile force or a compressive force by slant sides of the trapezoid-shaped cross beam.

For example, where the cross beam is included as a straight member and the spacing between left and right arm portions of the swing arm is wide, the cross beam becomes longer, and a greater flexural moment is generated in the cross beam. In contrast, according to the present invention, the flexural moment can be decreased, and the rigidity of the cross beam against the extension and contraction of the shock absorber unit can be enhanced.

The fitting of the upper end of the shock absorber unit to the swing arm and the fitting of the lower end of a rear shock absorber unit to the vehicle body side are performed respectively through spherical sliding bearings.

By fitting the upper end and the lower end of the shock absorber unit through the spherical sliding bearings, inclinations of the shock absorber unit with reference to the swing arm side and the vehicle body side can be absorbed, so that excessive external forces can be prevented from acting on the shock absorber unit itself, on the swing arm side or on the vehicle body side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the present invention will be described below based on the accompanying drawings.

Figure 1:
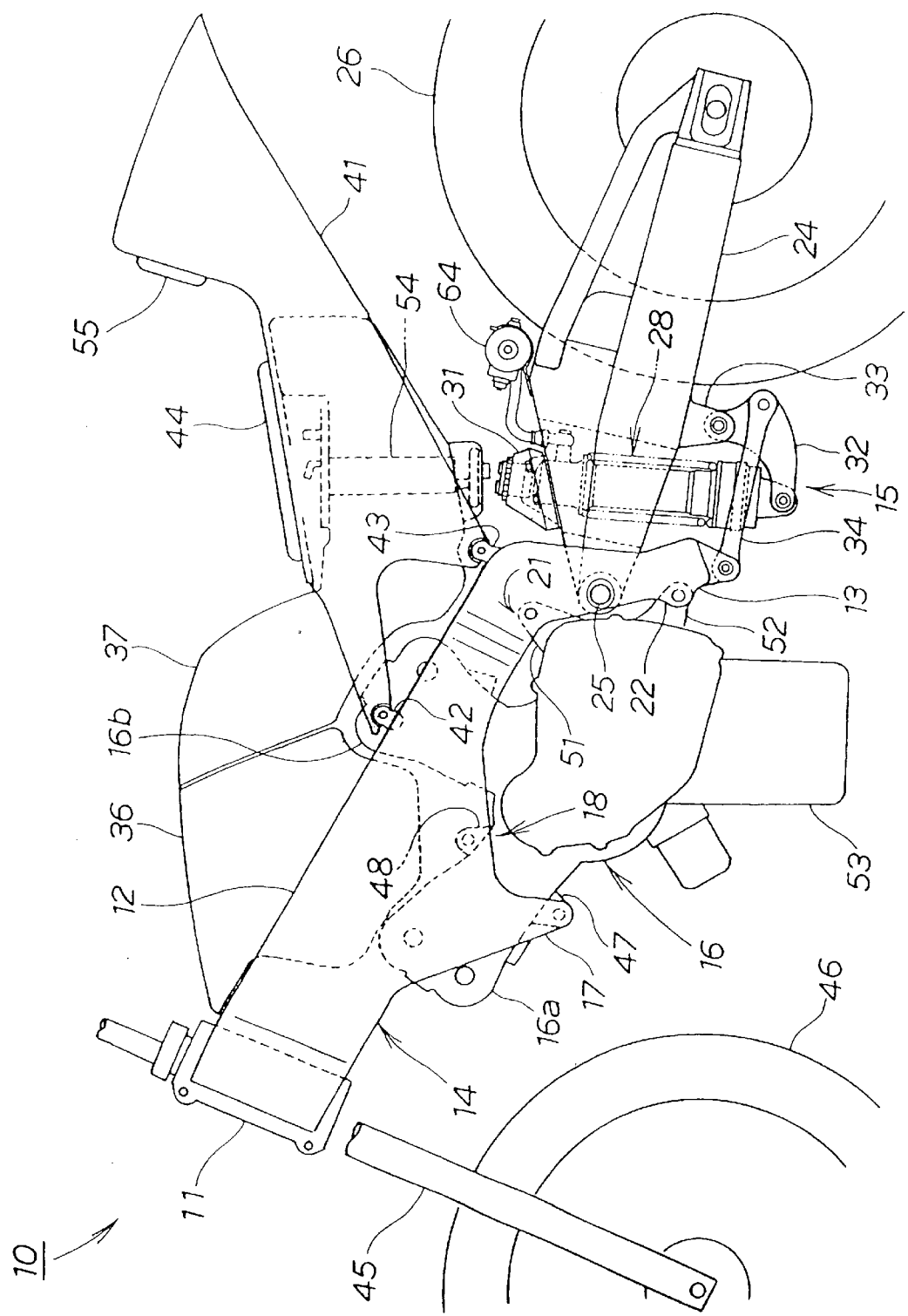
FIG. 1 is a side view of a major portion of a motorcycle adopting a rear suspension structure according to the present invention.

FIG. 1 is a side view of a major part of a motorcycle adopting a rear suspension structure according to the present invention. The motorcycle 10 is a vehicle which includes a vehicle body frame 14 including a left-right pair of main frames 12, 12 (the main frame 12 on the deep side is not shown) extending rearwardly and downwardly from a head pipe 11. Pivot brackets 13, 13 (the pivot bracket 13 on the deep side is not shown) are mounted on the vehicle body side and are fitted to rear portions of the main frames 12, 12. A rear suspension device 15 according to the present invention is fitted to the pivot brackets 13, 13.

A V-type engine 16 includes a front-side cylinder 16a and a rear-side cylinder 16b, which is fitted to respective engine-fitting portions 17, 18 of the main frames 12, 12 and respective engine-fitting portions 21, 22 of the pivot brackets 13, 13.

A swing arm 24 is swingably fitted to a pivot shaft 25 which is provided as a bridge between the pivot brackets 13, 13, and a rear wheel 26 as the wheel is fitted to the rear end of the swing arm 24.

A rear shock absorber unit 28 is provided with an upper end fitted to a shock absorber-fitting beam 31 as a cross beam fitted to an upper portion of the swing arm 24, and the lower end is fitted to a lower portion bracket 33 provided at a lower portion of the swing arm 24 through a first link 32. The first link 32 is fitted to the lower ends of the pivot brackets 13, 13 through a second link 34.

An intake box 36 is provided for reserving air for supplying air to the engine 16 and which is fitted to upper portions of the main frames 12, 12.

A fuel tank 37 is disposed on the upper side of the main frames 12, 12 and on the rear side of and in proximity to the intake box 36.

A rear fender 41 includes a front portion fitted to cowl-fitting portions 42, 43 provided respectively at upper portions of the main frames 12, 12 for covering the upper side of a rear portion of the fuel tank 37, and further covers the upper side of the rear wheel 26. A seat 44 is fitted to an upper surface of the rear fender 41 corresponding to the upper side of a rear portion of the fuel tank 37.

A front fork 45 is steerably fitted to the head pipe 11. A front wheel 46 is fitted to the lower end of the front fork 45. Hanger portions 47 and 48 are provided on the side of the engine 16 for fitting the engine 16 to the main frames 12, 12. Hanger portions 51 and 52 are provided on the side of the engine 16 for fitting the engine 16 to the pivot brackets 13, 13. An oil pan 53 is provided at a lower portion of the engine 16. A fuel pump 54 is provided in the fuel tank 37. A back rest 55 is provided on the rear fender 41 on the rear side of the seat 44.

Figure 2:
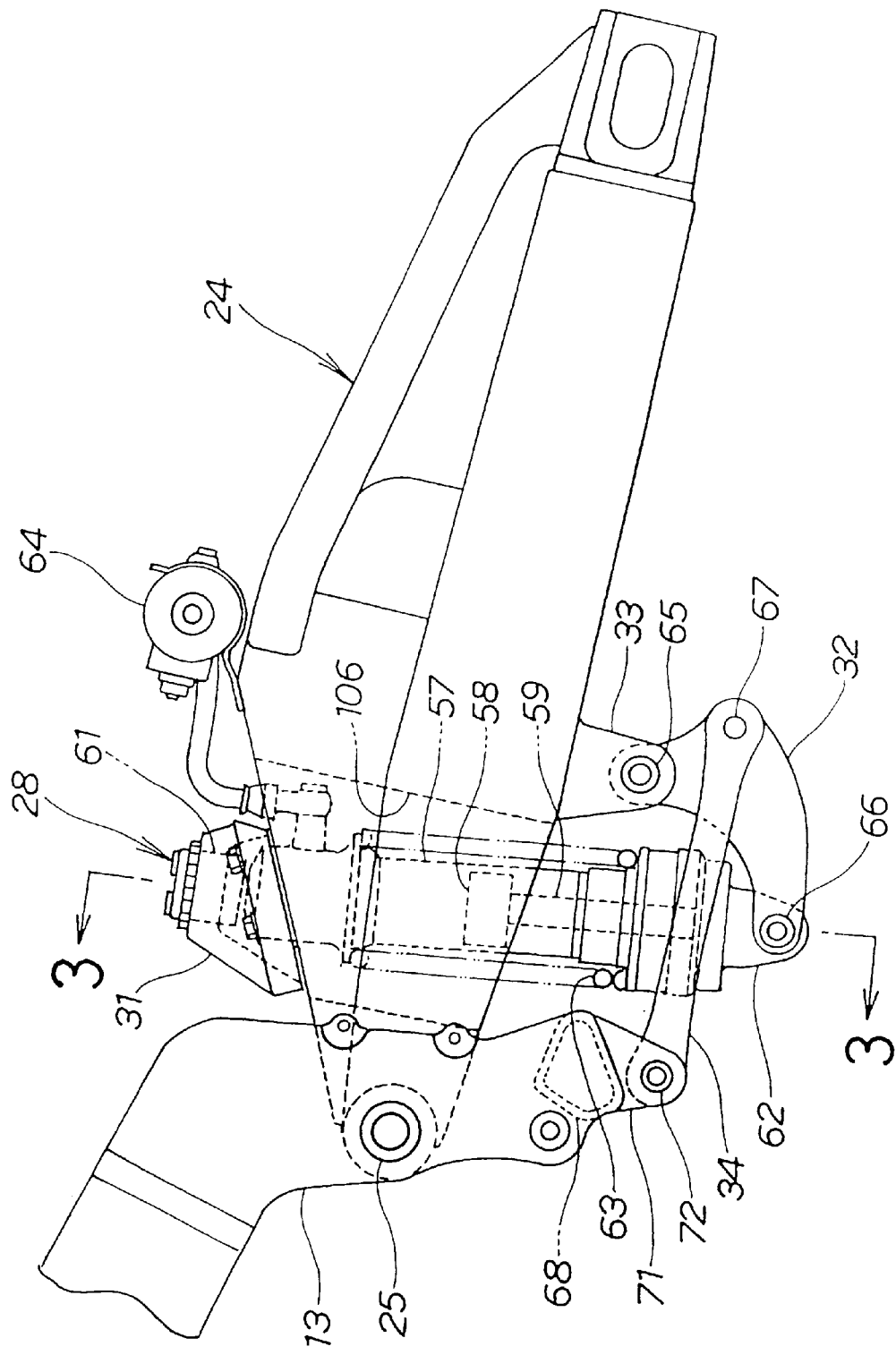
FIG. 2 is a side view of a major portion for illustrating the rear suspension structure according to the present invention.

FIG. 2 is a side view of a major part for illustrating the rear suspension structure according to the present invention. The rear shock absorber unit 28 includes a cylinder portion 57 filled with oil. A piston 58 is movably inserted in the cylinder portion 57 with a piston rod 59 fitted to the piston 58. A swing arm side fitting portion 61 (namely, the upper end of the shock absorber unit) is provided at an end portion of the cylinder portion 57 for fitting to the shock absorber-fitting beam 31 of the swing arm 24. A link side fitting portion 62 (namely, the lower end of the shock absorber) is provided at an end portion of the piston rod 59 for fitting to the first link 32. A spring 63 is intermediately provided between the swing arm side fitting portion 61 and the link side fitting portion 62. A reservoir tank 64 is provided for reserving the oil flowing out from the cylinder portion 67 upon thermal expansion of the oil contained in the cylinder portion 57.

The first link 32 is fitted with three support shafts 65, 66, 67 and is swingably fitted to the lower portion bracket 33 through the support shaft 65. The first link 32 is swingably fitted to the rear shock absorber unit 28 through the support shaft 66, and the second link 34 is swingably fitted to the first link 32 through the support shaft 67.

The second link 34 is swingably fitted, through a support shaft 72, to two link-fitting portions 71, 71 (the link-fitting portion 71 on the deep side is not shown) provided on a cross beam 68 connecting the respective lower ends of the pivot brackets 13, 13.

Figure 3:
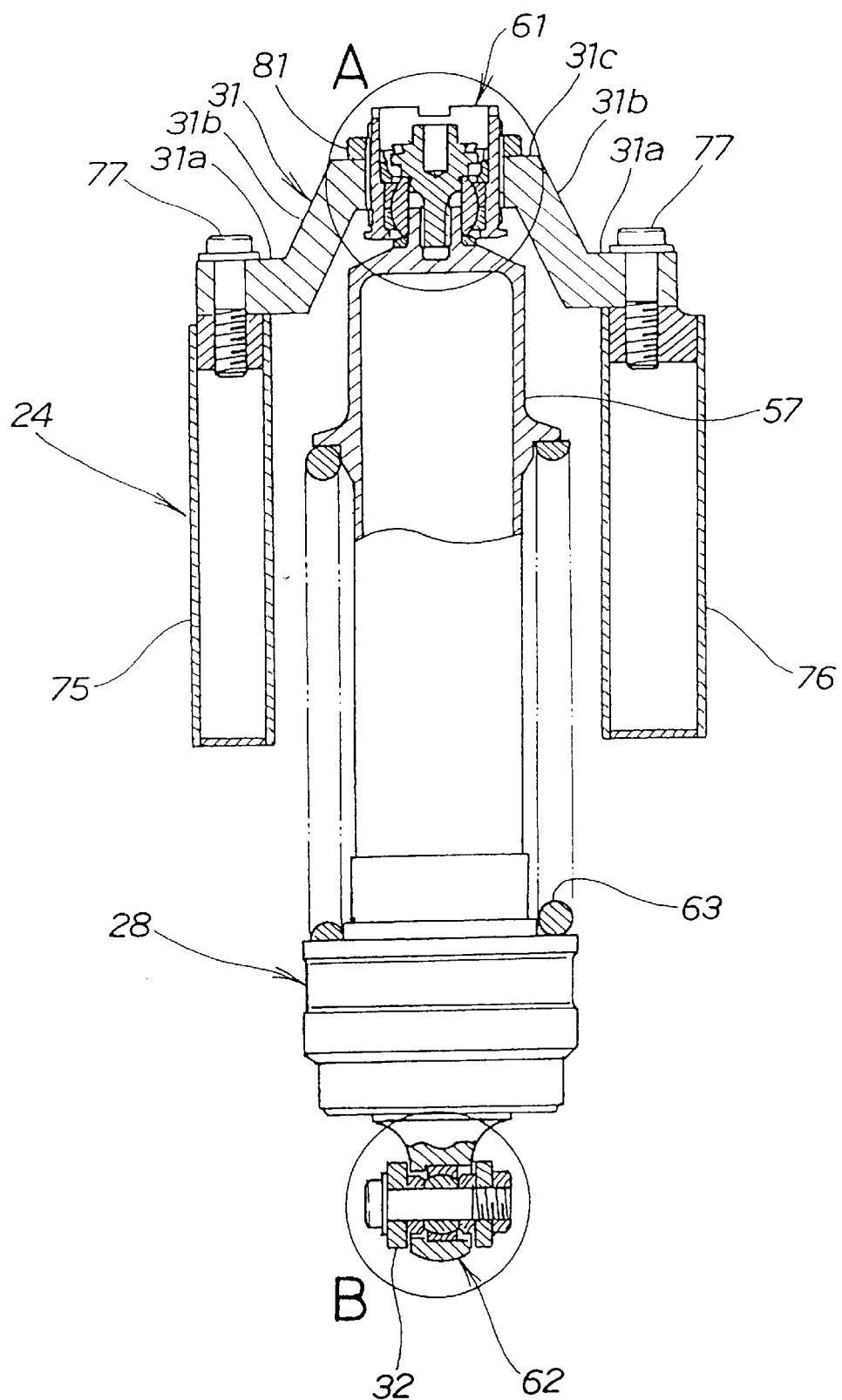
FIG. 3 is a sectional view taken along line 3—3 of FIG. 2.

FIG. 3 is a sectional view taken along line 3—3 of FIG. 2, for illustrating the condition where the trapezoid-shaped shock absorber-fitting beam 31 is fitted by bolts 77, 77 to respective upper portions of a left arm portion 75 and a right arm portion 76 disposed on the left and right sides of the swing arm 24 and extending in the longitudinal direction. The swing arm side fitting portion 61 of the rear shock absorber unit 28 is screw-connected to a shock absorber-fitting portion 31c as the upper side of the shock absorber-fitting beam 31. The link side fitting portion 62 of the rear shock absorber unit 28 is fitted to the first link 32. A lock nut 81 is provided for fixing the swing arm side fitting portion 61 to the shock absorber-fitting beam 31.

The shock absorber-fitting beam 31 includes base portions 31a, 31a for fitting to the swing arm 24, inclined portions 31b, 31b skewly rising to the inner upper side from the base portions 31a, 31a, and the above-mentioned shock absorber-fitting portion 31c for connecting respective upper portions of the inclined portions 31b, 31b and for fitting the rear shock absorber unit 28.

Figure 4:
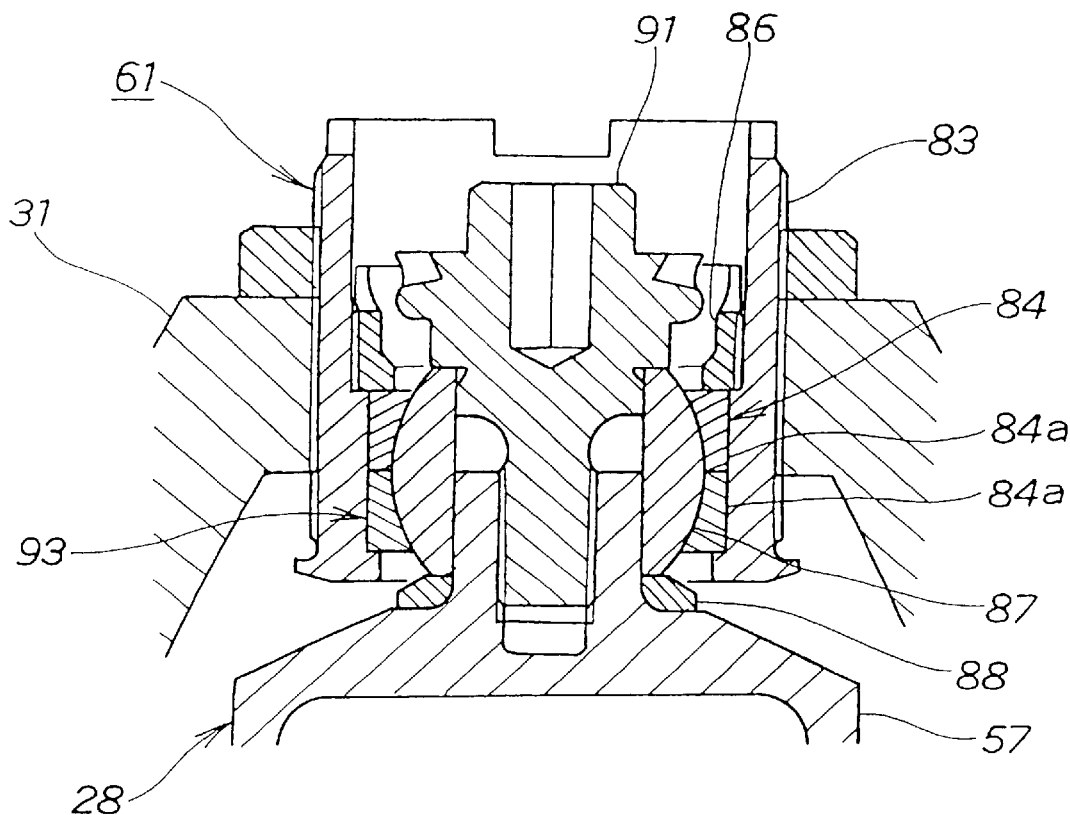
FIG. 4 is an enlarged view of portion A of FIG. 3.

FIG. 4 is an enlarged view of portion A of FIG. 3. The swing arm side fitting portion 61 of the rear shock absorber unit 28 includes a tubular case 83 screw-connected to the shock absorber-fitting beam 31, an outer ring 84 is contained in the case 83, an outer ring fixing nut 86 is screw-connected to the inside surface of the case 83 for fixing the outer ring 84 in the case 83, an inner ring 87 is slidably mounted on the inside surface of the outer ring 84. An inner ring fixing bolt 91 is provided for fixing the inner ring 87 to an end portion of the cylinder portion 57 through a spacer 88.

The above-mentioned outer ring 84 has a structure in which the inside surface of a tubular member is formed as a part of a concave spherical surface and outer ring halves 84a, 84a of the same shape are disposed adjacent to each other. The inner ring 87 has a structure in which the outside surface of a tubular member is formed as a part of a convex spherical surface.

The outer ring 84 and the inner ring 87 constitute a spherical sliding bearing 93.

Figure 5:
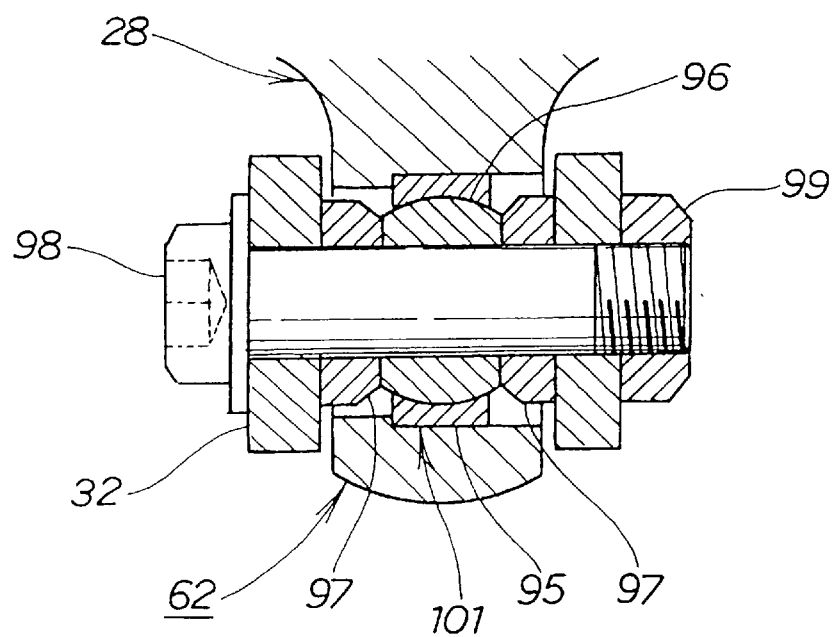
FIG. 5 is an enlarged view of portion B of FIG. 3.

FIG. 5 is an enlarged view of portion B of FIG. 3. The link side fitting portion 62 of the rear shock absorber unit 28 includes an outer ring 95 fitted to the side of the piston rod 59 (See FIG. 2) with an inner ring 96 slidably mounted on the outside surface of the outer ring 95. Spacers 97, 97 are provided for clamping the inner ring 96 therebetween. The spacers 97, 97 are disposed on the inside of the first link 32. A bolt 98 is provided for penetrating through the inner ring 96, the spacers 97, 97 and the first link 32 for fastening the portion between the first links 32. A nut 99 is screw-connected to the tip end of the bolt 98.

The outer ring 95 and the inner ring 96 constitutes a spherical sliding bearing 101.

Figure 6:
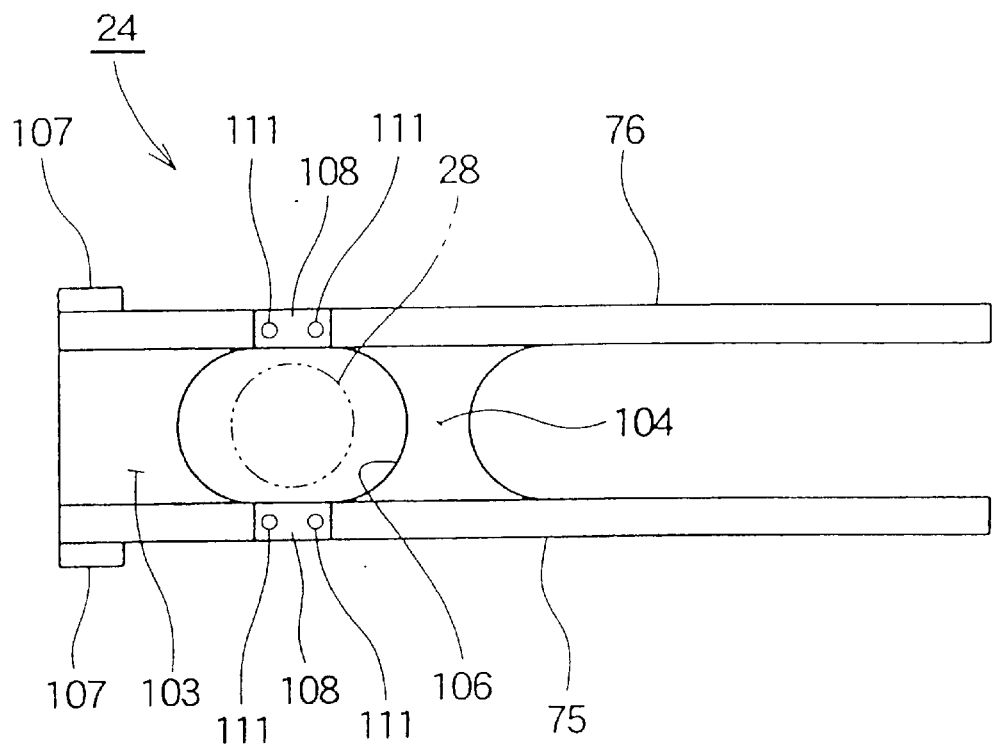
FIG. 6 is a plan view of a swing arm in the rear suspension structure according to the present invention.

FIG. 6 is a plan view of the swing arm in the rear suspension structure according to the present invention. The swing arm 24 is a member which includes a left arm portion 75 and a right arm portion 76 extending in the longitudinal direction with a front portion connecting portion 103 and an intermediate portion connecting portion 104 for connecting between the left arm portion 75 and the right arm portion 76. A window portion 106 is provided for passing the rear shock absorber unit 28 therethrough between the front portion connecting portion 103 and the intermediate portion connecting portion 104. Pivot shaft support portions 107, 107 are provided for supporting the pivot shaft 25 (See FIG. 2). Fitting seats 108 for fitting the shock absorber-fitting beam 31 are provided respectively on upper surfaces of the left arm portion 75 and the right arm portion 76. The fitting seats 108 are provided with female screw portions 111, 111 for screwing the bolts 77 (See FIG. 3).

Figure 7:
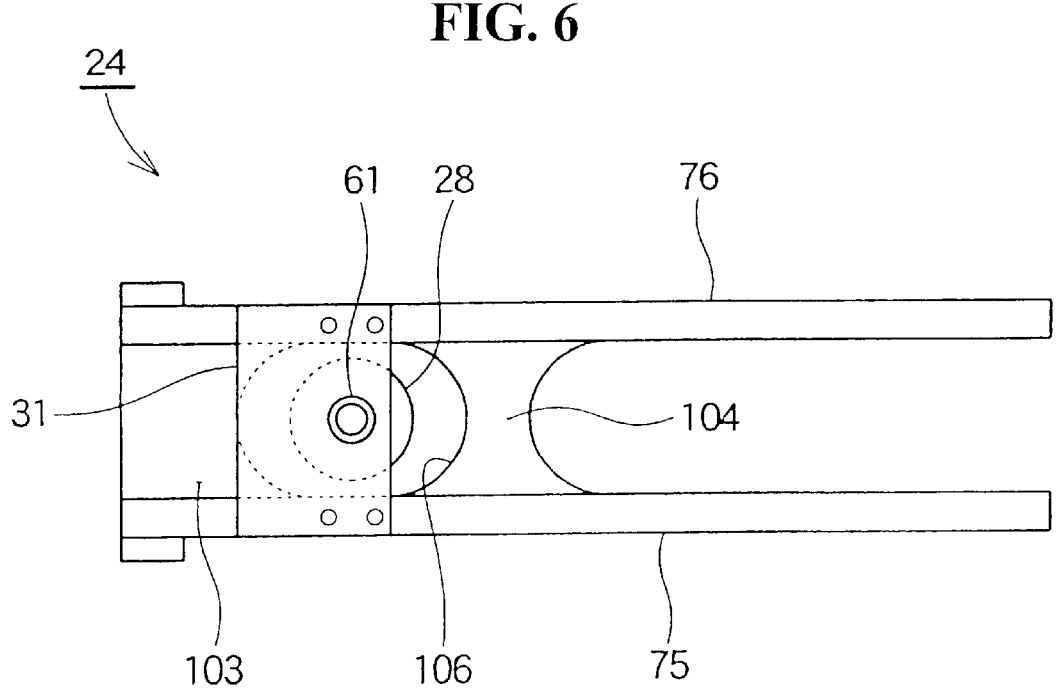
FIG. 7 is a first action view for illustrating the action or effects of the rear suspension structure according to the present invention.

The action or effects of the rear suspension structure described above will be described below. FIG. 7 is a first action view for illustrating the action or effects of the rear suspension structure according to the present invention.

When the swing arm side fitting portion 61 of the rear shock absorber unit 28 is fitted to the swing arm 24 through the shock absorber-fitting beam 31, the shock absorber-fitting beam 31 closes a part of the window portion 106 of the swing arm 24. Therefore, by fitting the shock absorber-fitting beam 31 to the swing arm 24, the rigidity of the surroundings of the window portion 106 provided for passing the rear shock absorber unit 28 therethrough is enhanced. Accordingly, the flexural rigidity and torsional rigidity of the swing arm 24 as a whole can be enhanced.

As has been described referring to FIG. 2 and FIG. 7 above, the present invention is firstly characterized in that, in a rear suspension structure includes the swing arm 24 having one end swingably fitted to the pivot shaft 25 provided on the pivot brackets 13, 13. The rear wheel 26 (See FIG. 1) are fitted to the other end of the swing arm 24 with the rear shock absorber unit 28 having the swing arm side fitting portion 61 fitted to the swing arm 24 and the link side fitting portion 62 of the rear shock absorber unit 28 being connected to the pivot brackets 13, 13 through a link mechanism included of the first link 32 and the second link 34. The left arm portion 75 and the right arm portion 76 extending in the front-rear direction are provided on the left and right sides of the swing arm 24. The window portion 106 for passing the rear shock absorber unit 28 therethrough is provided between the left arm portion 75 and the right arm portion 76. The shock absorber-fitting beam 31 is provided like a bridge between the left arm portion 75 and the right arm portion 76. The swing arm side fitting portion 61 of the rear shock absorber unit 28 is fitted to the shock absorber-fitting beam 31. The whole part of a part of the window portion 106 is closed with the shock absorber-fitting beam 31.

Since the whole part or a part of the window portion 106 of the swing arm 24 is closed with the shock absorber-fitting beam 31, the swing arm 24 can be reinforced by the shock absorber-fitting beam 31, so that the flexural rigidity and torsional rigidity of the swing arm 24 can be enhanced.

Since the shock absorber-fitting beam 31, as a fitting member for the rear shock absorber unit 28 functions also as a reinforcement member for the swing arm 24, it is unnecessary to specially fit a reinforcement member to the swing arm 24. Further, since the upper end of the rear shock absorber unit 28 is fitted to the swing arm 24 through the shock absorber-fitting beam 31, the upper portion cross pipe 302 and the bracket portion 304 provided on the vehicle body frame 300 shown in FIG. 10 according to the prior art are unnecessary in the present invention, so that an increase in weight can be restrained even though the shock absorber-fitting beam 31 is fitted to the swing arm 24.

Figure 8B:
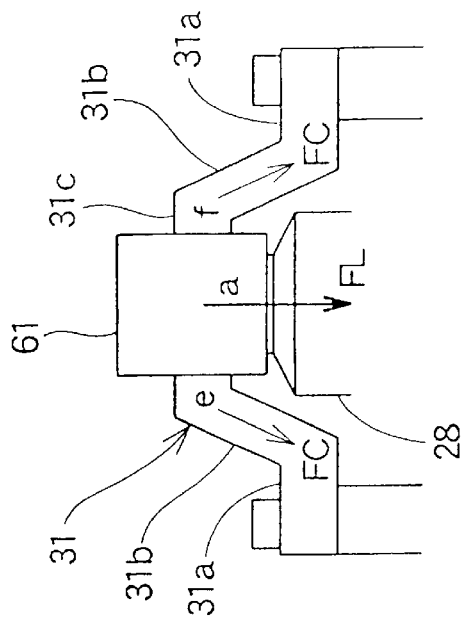
FIGS. 8(a)–8(d) are views for illustrating the action or effects of the rear suspension structure according to the present invention.
Figure 8D:
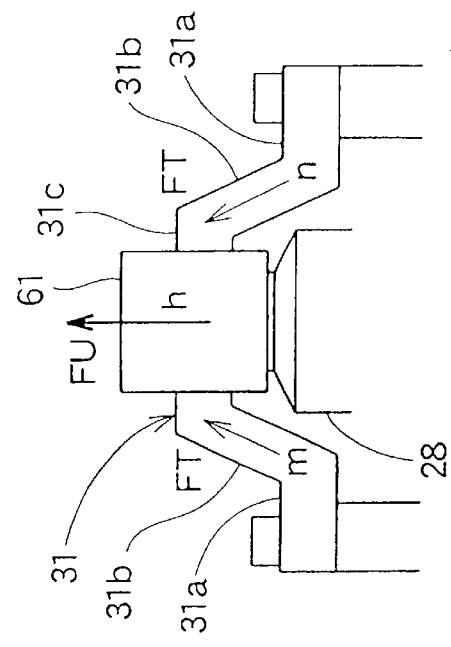
Figure 8A:
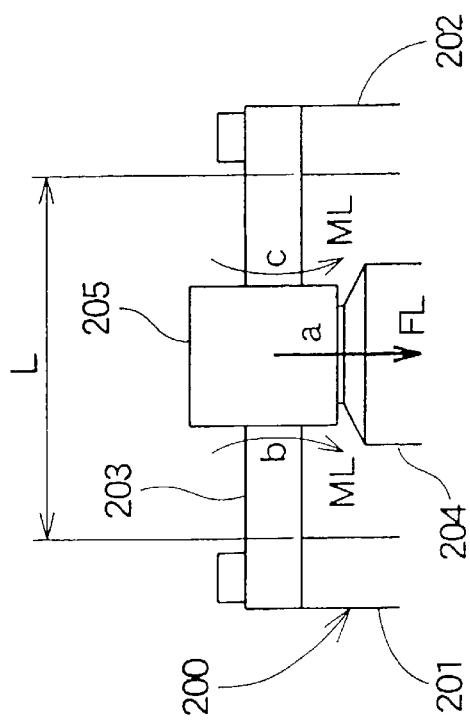
Figure 8C:
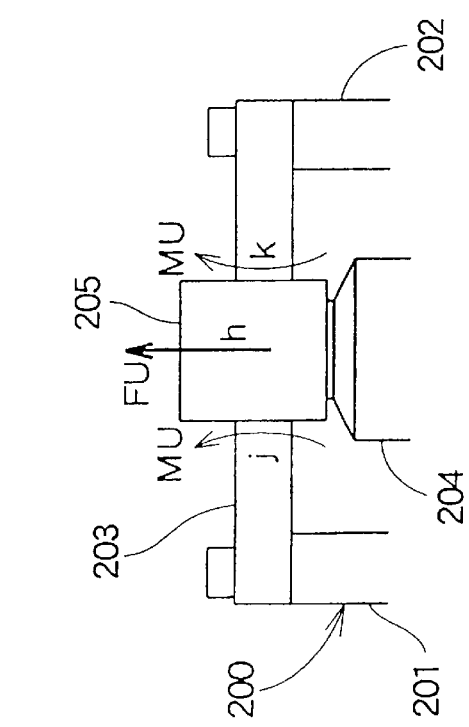

FIGS. 8(a) to 8(d) are second action views for illustrating the action or effects of the rear suspension structure according to the present invention, in which FIGS. 8(a) and 8(c) show comparative examples, and FIGS. 8(b) and 8(d) show the embodiments of the present invention.

In the comparative example of FIG. 8(a), a straight beam 203 is fitted to arm portions 201, 202 of a swing arm 200. An upper portion fitting portion 205 of a shock absorber unit 204 is fitted to the beam 203. In this structure, when the shock absorber unit 204 is extended, a downward force FL acts on the upper portion fitting portion 205 as indicated by arrow a, and flexural moments ML act on the beam 203 in the directions of arrow b and arrow c.

Since the spacing L between the arm portion 201 and the arm portion 202 of the swing arm 200 is large, the flexural moments ML are much larger.

In the embodiment of FIG. 8(b), when the rear shock absorber unit 28 is extended, a force FL acts on the swing arm side fitting portion 61 as indicated by arrow a, in the same manner as in FIG. 8(a), and compressive forces FC acts on the inclined portions 31b, 31b of the shock absorber-fitting beam 31 in the directions of arrow e and arrow f.

At this time, though flexural moments act on the base portions 31a, 31a and the shock absorber-fitting portion 31c of the shock absorber-fitting beam 31, the flexural moments are smaller than the flexural moments ML described in FIG. 8(a) because the horizontal portion is short.

In the comparative example of FIG. 8(c), when the shock absorber unit 204 contracts, an upward force FU acts on the upper portion fitting portion 205 as indicated by arrow h, and flexural moments MU act on the beam 203 in the directions of arrow j and arrow k.

In the embodiment of FIG. 8(d), when the rear shock absorber unit 28 contracts, a force FU acts on the swing arm side fitting portion 61 as indicated by arrow h, in the same manner as in FIG. 8(c), and tensile forces FT act on the inclined portions 31b, 31b of the shock absorber-fitting beam 31 in the directions of arrow m and arrow n.

At this time, though flexural moments act on the base portions 31a, 31a and the shock absorber-fitting portion 31c of the shock absorber-fitting beam 31, the flexural moments are smaller than the flexural moments MU described in FIG. 8(c) because the horizontal portion is short.

Thus, in the embodiments described in FIGS. 8(b) and 8(d) above, when vertical forces act on the shock absorber-fitting beam 31 due to an extension or contraction of the rear shock absorber unit 28, the vertical forces can be supported roughly as a compressive force or a tensile force by the inclined portions 31b, 31b of the shock absorber-fitting beam 31.

As has been described referring to FIGS. 2, 3 and 8(b) and 8(d) above, the present invention is secondly characterized in that the shock absorber-fitting beam 31 is trapezoid shaped in front view with the swing arm side fitting portion 61 of the rear shock absorber unit 28 fitted to the shock absorber-fitting portion 31c of the shock absorber-fitting beam 31.

With the shock absorber-fitting beam 31 trapezoid shaped in front view, when vertical forces are exerted on the shock absorber-fitting beam 31 due to an extension or contraction of the rear shock absorber unit 28, the vertical forces can be received roughly as a tensile force or a compressive force by the inclined portions 31b, 31b of the trapezoid-shaped shock absorber-fitting beam 31. For example, in the case where the beam includes a straight member and the spacing between the left and right arm portions of the swing arm is wide, the horizontal portion of the beam is long and a much larger flexural moment is generated in the beam. In contrast, according to the present invention, the flexural moments can be reduced, and the rigidity of the shock absorber-fitting beam 31 against the extension and contraction of the rear shock absorber unit 28 can be enhanced.

Therefore, it is unnecessary to enlarge the cross-sectional area of the shock absorber-fitting beam 31 or to specially reinforce the shock absorber-fitting beam 31, so that the weight of the shock absorber-fitting beam 31 can be reduced. Thus, production costs of the shock absorber-fitting beam 31 and the rear suspension device 15 (See FIG. 1) can be reduced.

In addition, with the shock absorber-fitting beam 31 being trapezoid in shape, the overall length of the rear shock absorber unit 28 can be enlarged, and a stroke amount required for the rear shock absorber unit 28 can be easily secured.

Further, with the shock absorber-fitting beam 31 is screw-connected to the swing arm side fitting portion 61 of the rear shock absorber unit 28, the vertical fitting pitch of the rear shock absorber unit 28 can be easily changed by rotating the swing arm side fitting portion 61, so that the adjustment of the vehicle height can be performed speedily and easily.

Figure 9:
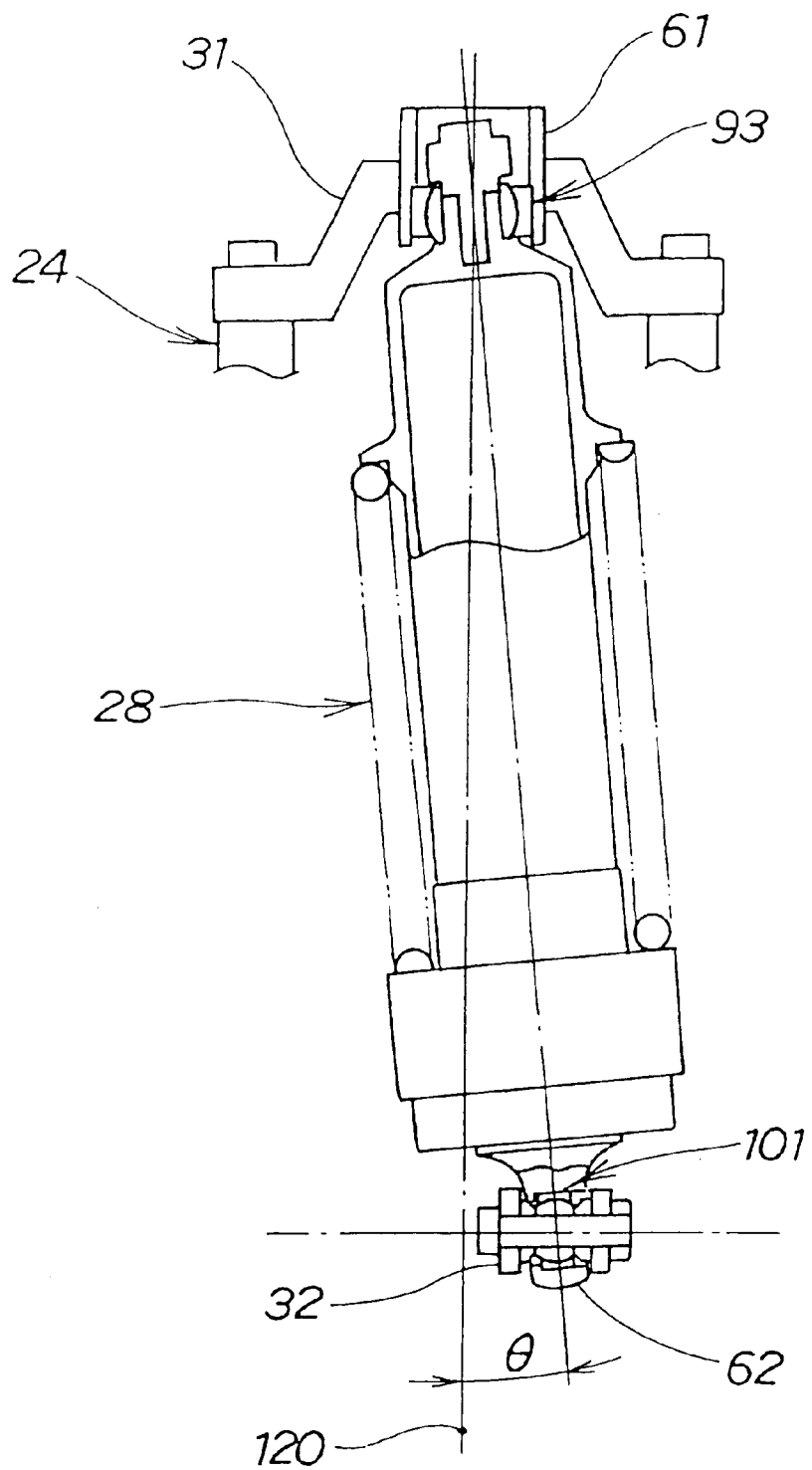
FIG. 9 is a third action view for illustrating the action or effects of the rear suspension structure according to the present invention.

FIG. 9 is a third action view for illustrating the action or effects of the rear suspension structure according to the present invention.

For example, where the rear shock absorber unit 28 is inclined relative to a normal fitting position (here, the normal fitting position of the rear shock absorber unit 28 is represented by a cylinder axis 120 of the rear shock absorber unit 28 fitted) by an angle θ (the actual angle θ is very small, but here it is exaggerated for convenience of illustration) due to, for example, torsion of the vehicle body during operation or due to an error in mounting. The inclination of the rear shock absorber unit 28 can be absorbed by the spherical sliding bearing 93 at the swing arm side fitting portion 61 and the spherical sliding bearing 101 a the link side fitting portion 62.

As has been described above, the present invention is characterized in that the fitting of the swing arm fitting portion 61 of the rear shock absorber unit 28 and the fitting of the link side fitting portion 62 of the rear shock absorber unit 28 to the side of the pivot brackets 13, 13 are performed respectively through the spherical sliding bearings 93, 101.

The fitting of the swing arm side fitting portion 61 and the link side fitting portion 62 of the rear shock absorber unit 28 is performed through the spherical sliding bearings 93, 101, whereby the inclination of the rear shock absorber unit 28 relative to the swing arm 24 side and the first link 32 side can be absorbed. Thus, excessive external forces can be prevented from acting on the rear shock absorber unit 28 itself, the swing arm 24, the shock absorber-fitting beam 31, the first link 32, the second link 34 (See FIG. 2), the pivot brackets 13, 13 (See FIG. 2) or the like.

Figure 10:
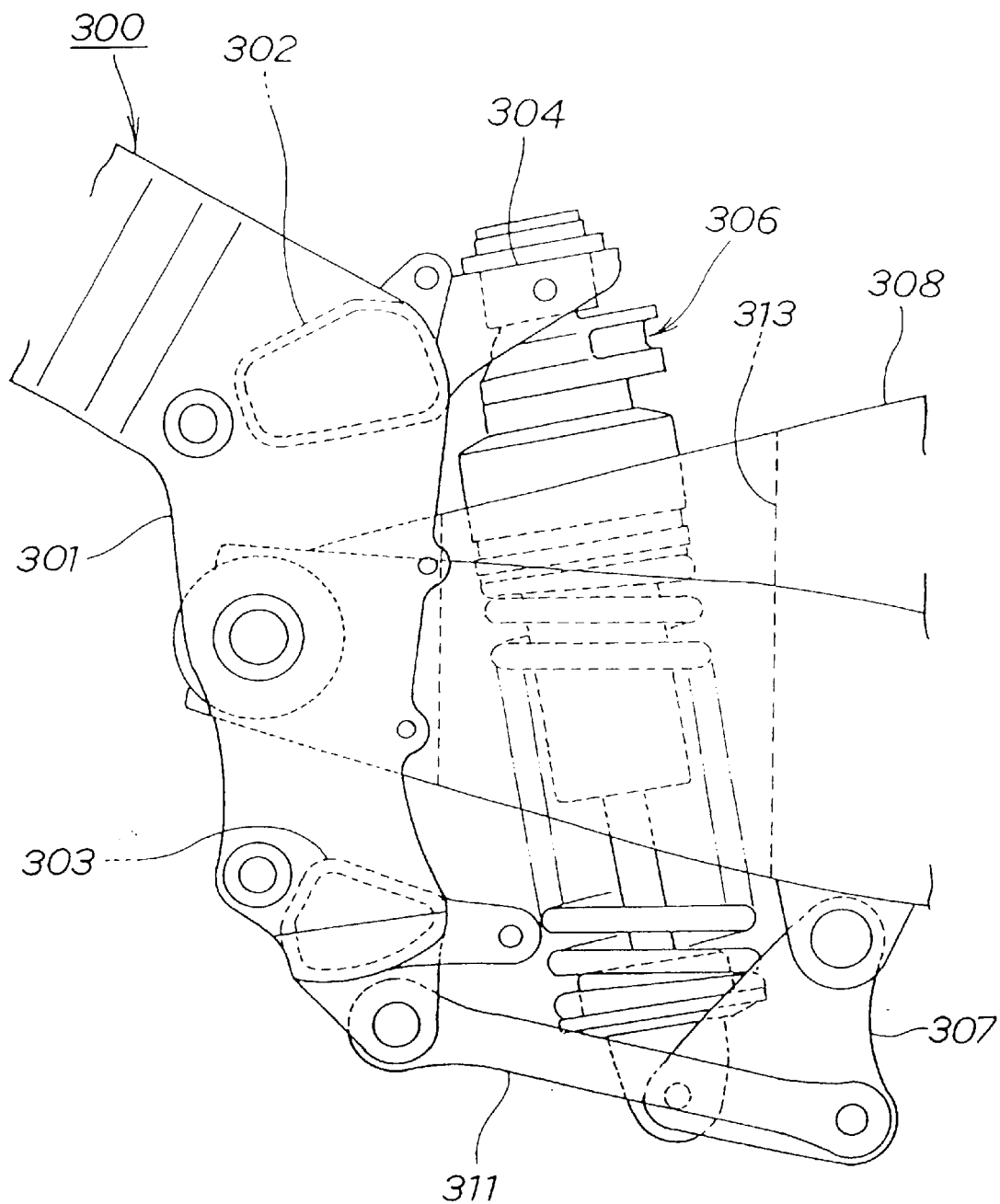
FIG. 10 is a side view of a major portion for illustrating a conventional rear suspension structure.

In the technology shown in FIG. 10 according to the prior art, when the upper end of the rear shock absorber unit 306 is fitted to a bracket portion 304 by, for example, a bolt-nut combination, upon inclination of the rear shock absorber unit 306 relative to the swing arm 308 in the vehicle width direction, the inclination cannot be absorbed. Thus, excessive external forces are exerted on the rear shock absorber unit 306 itself, the bracket portion 304 and the upper portion cross pipe 302, and deflection or deformation would be generated, which is undesirable in view of durability.

In contrast, according to the present invention, the rear shock absorber unit 28 is rationally and easily inclined relative to the swing arm 24 side and the first link 32 side due to the presence of the spherical sliding bearings 93, 101, so that there is no problem as to durability of each of the above-mentioned portions. Thus, not only the inclination in the vehicle width direction but also inclinations in any direction can be absorbed freely.

While the cross beam has been described as being trapezoid shaped in the present invention, the shape of the cross beam is not limited to this shape. For example, the cross beam may be in the shape of an upwardly convex arch in front view.

In addition, while the upper end of the shock absorber unit has been fitted to the swing arm through the spherical sliding bearing in the present invention, the structure is not limited to this construction. A side surface of a cylinder portion of the shock absorber unit may be fitted to the swing arm through a spherical sliding bearing. More specifically, a structure may be adopted in which an inner ring of a spherical sliding bearing may be fitted to the side surface of the cylinder portion of the shock absorber unit by a screw connection or the like and an outer ring of the spherical sliding bearing may be fitted to the swing arm. With such a structure, the vertical fitting pitch of the shock absorber unit can be shortened, and the inclination of the shock absorber unit relative to the swing arm can be absorbed.

Further, while the axis of the inner ring is parallel to or coincides with the cylinder axis of the shock absorber unit in the spherical sliding bearing on the upper end side of the shock absorber unit in the embodiment of the present invention, the structure is not limited to this construction. For example, the axis of the inner ring may be orthogonal to the cylinder axis of the shock absorber unit.

Furthermore, the spherical sliding bearing in the present invention may be of an oiled type or a non-oiled type. Particularly, the non-oiled type is advantageous on the basis of maintenance.

The rear suspension structure for a motorcycle according to the present invention is the rear suspension structure including the swing arm having one end swingably fitted to the pivot shaft provided on the vehicle body side with the wheel fitted to the other end of the swing arm, and the shock absorber unit having an upper end fitted to the swing arm and a lower end of the shock absorber unit being connected to the vehicle body side. The arm portions extending in the front-rear directions are provided on the left and right sides of the swing arm with a window portion for passing the shock absorber unit therethrough being provided between the arm portions. The cross beam is provided like a bridge between the arm portions with the upper end of the shock absorber unit fitted to the cross beam. A whole part or a part of the window portion is closed with the cross beam. Therefore, the swing arm can be reinforced by the cross beam, and the flexural rigidity and torsional rigidity of the swing arm can be enhanced. Moreover, since the upper end of the shock absorber unit is fitted to the swing arm side, it is unnecessary to provide, for example, a fitting portion for the upper end of the shock absorber unit on the vehicle body frame side, so that an increase in weight can be restrained.

The rear suspension structure for a motorcycle according to the present invention is a structure in which the cross beam is trapezoid shaped in front view with the upper end of the shock absorber unit is fitted to the upper side of the cross beam. Therefore, when a vertical force is exerted on the beam due to an extension or contraction of the shock absorber unit, the vertical force can be received roughly as a tensile force or a compressive force by the slant sides of the trapezoid-shaped cross beam.

For example, where the cross beam is included as a straight member and the spacing between the left and right arm portions of the swing arm is wide, a larger flexural moment is generated. In contrast, according to the present invention, the flexural moment can be reduced, so that the rigidity of the cross beam against an extension and contraction of the shock absorber unit can be enhanced.

Therefore, it is unnecessary to enlarge the cross sectional area of the cross beam or to specially reinforce the cross beam, so that the cross beam can be made smaller in weight. Thus, the production costs of the cross beam and the rear suspension device can be reduced.

The rear suspension structure for a motorcycle according to the present invention is a structure in which the fitting of the upper end of the shock absorber unit to the swing arm and the fitting of the lower end of the shock absorber unit to the vehicle body side are performed respectively through spherical sliding bearings. Therefore, the inclinations of the shock absorber unit relative to the swing arm side and the vehicle body side can be absorbed. Thus, excessive external forces can be prevented from acting on the shock absorber unit itself, the swing arm side or the vehicle body side.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear suspension structure for motorcycle comprising:
   a swing arm having a first end swingably fitted to a pivot shaft provided on a vehicle body side;
   a wheel fitted to a second end of said swing arm;
   a shock absorber unit having an upper end fitted to said swing arm with a lower end of said shock absorber unit connected to the vehicle body side;
   arm portions extending in the front-rear direction are provided on a left side and a right side, respectively, of said swing arm;
   a window portion for passing said shock absorber unit therethrough is provided between said arm portions; and
   a cross beam is provided between said arm portions, said upper end of said shock absorber unit is fitted to said cross beam, and a whole section of said window portion adjacent to the upper end of said shock absorber is closed with said cross beam.

2. The rear suspension structure for motorcycle according to claim 1, wherein said cross beam is trapezoidal in shape in a front view, and said upper end of said shock absorber unit is fitted to an upper side of said cross beam.

3. The rear suspension structure for motorcycle according to claim 1, wherein a fitting of said upper end of said shock absorber unit to said swing arm and a fitting of said lower end of a rear shock absorber unit to the vehicle body side are, respectively, spherical sliding bearings.

4. The rear suspension structure for motorcycle according to claim 2, wherein a fitting of said upper end of said shock absorber unit to said swing arm and a fitting of said lower end of a rear shock absorber unit to the vehicle body side are, respectively, spherical sliding bearings.

5. The rear suspension structure for motorcycle according to claim 1, wherein said cross beam is disposed a predetermined distance relative to the first end of said swing arm for enabling said shock absorber to compensate for movement of said wheel.

6. The rear suspension structure for motorcycle according to claim 1, wherein said cross beam is a reinforcing member for enhancing the flexure rigidity and torsional rigidity of the swing arm.

7. The rear suspension structure for motorcycle according to claim 1, wherein said cross beam includes a first base portion secured to said left side of said swing arm and a second base portion secured to said right side of said swing arm, a first inclined portion extending upwardly from the first base portion, a second inclined portion extending upwardly from the second base portion and a fitting portion connecting upper portions of said first and second inclined portions, said upper end of said shock absorber being mounted on said fitting portion.

8. The rear suspension structure for motorcycle according to claim 1, and further including a tubular case mounted on said cross beam, an outer ring being operatively mounted within said tubular case and an inner ring being positioned for angular movement within said outer ring, said inner ring being secured to said upper end of said shock absorber for permitting limited movement of said shock absorber relative to said cross beam.

9. The rear suspension structure for motorcycle according to claim 8, wherein said outer ring includes a concave surface and said inner ring includes a spherical surface for permitting relative angular movement therebetween.

10. The rear suspension structure for motorcycle according to claim 8, and further including a fixing bolt for securing said inner ring relative to said upper end of said shock absorber.

11. A rear suspension structure for motorcycle comprising:
   a swing arm having a first end swingably fitted to a pivot shaft provided on a vehicle body side;
   a wheel fitted to a second end of said swing arm;
   a shock absorber unit having an upper end fitted to said swing arm with a lower end of said shock absorber unit connected to the vehicle body side;
   arm portions extending in the front-rear direction are provided on a left side, and right side, respectively, of said swing arm;

a window portion for passing said shock absorber unit therethrough is provided between said arm portions; and a cross beam is provided between said arm portions, said upper end of said shock absorber unit is fitted to said cross beam, and a part of said window portion adjacent to the upper end of said shock absorber is closed with said cross beam.

12. The rear suspension structure for motorcycle according to claim 11, wherein said cross beam is trapezoidal in shape in a front view, and said upper end of said shock absorber unit is fitted to an upper side of said cross beam.

13. The rear suspension structure for motorcycle according to claim 11, wherein a fitting of said upper end of said shock absorber unit to said swing arm and a fitting of said lower end of a rear shock absorber unit to the vehicle body side are, respectively, spherical sliding bearings.

14. The rear suspension structure for motorcycle according to claim 12, wherein a fitting of said upper end of said shock absorber unit to said swing arm and a fitting of said lower end of a rear shock absorber unit to the vehicle body side are, respectively, spherical sliding bearings.

15. The rear suspension structure for motorcycle according to claim 11, wherein said cross beam is disposed a predetermined distance relative to the first end of said swing arm for enabling said shock absorber to compensate for movement of said wheel.

16. The rear suspension structure for motorcycle according to claim 11, wherein said cross beam is a reinforcing member for enhancing the flexure rigidity and torsional rigidity of the swing arm.

17. The rear suspension structure for motorcycle according to claim 11, wherein said cross beam includes a first base portion secured to said left side of said swing arm and a second base portion secured to said right side of said swing arm, a first inclined portion extending upwardly from the first base portion, a second inclined portion extending upwardly from the second base portion and a fitting portion connecting upper portions of said first and second inclined portions, said upper end of said shock absorber being mounted on said fitting portion.

18. The rear suspension structure for motorcycle according to claim 11, and further including a tubular case mounted on said cross beam, an outer ring being operatively mounted within said tubular case and an inner ring being positioned for angular movement within said outer ring, said inner ring being secured to said upper end of said shock absorber for permitting limited movement of said shock absorber relative to said cross beam.

19. The rear suspension structure for motorcycle according to claim 18, wherein said outer ring includes a concave surface and said inner ring includes a spherical surface for permitting relative angular movement therebetween.

20. The rear suspension structure for motorcycle according to claim 18, and further including a fixing bolt for securing said inner ring relative to said upper end of said shock absorber.

* * * * *